United States Patent [19]

Willis

[11] 4,220,298
[45] Sep. 2, 1980

[54] REMOVABLE SOFT DOOR FOR AIRCRAFT

[76] Inventor: Kathryn E. Willis, 3560 SE. Russell Ct., Hillsboro, Oreg. 97123

[21] Appl. No.: 956,258

[22] Filed: Oct. 30, 1978

[51] Int. Cl.² .............................................. B64C 1/14
[52] U.S. Cl. .................................. 244/129.5; 49/141; 160/354; 160/368 R; 160/DIG. 8; 160/DIG. 18; 244/17.11; 296/148
[58] Field of Search .............. 244/129.5, 129.4, 17.11; 296/146, 147, 148; 160/354, 368 R, DIG. 8, DIG. 18; 49/141

[56] References Cited

U.S. PATENT DOCUMENTS

| | | | |
|---|---|---|---|
| 2,346,977 | 4/1944 | La Sha | 244/129.5 |
| 2,391,871 | 1/1946 | Benson | 160/DIG. 18 |
| 2,599,690 | 6/1952 | Buivid et al. | 244/17.11 |
| 3,251,399 | 5/1966 | Grossman | 160/354 |
| 3,763,917 | 10/1973 | Antinone | 160/354 |
| 4,070,056 | 1/1978 | Hickman | 296/148 |
| 4,100,957 | 7/1978 | Shelton | 160/368 R |

*Primary Examiner*—Charles E. Frankfort
*Attorney, Agent, or Firm*—Clarence A. O'Brien; Harvey B. Jacobson

[57] ABSTRACT

A flexible transparent door is provided for attachment to the entry opening of a helicopter or other vehicle. This door has a semi-permanent attachment effected by means of Velcro or any comparable hook and pile material distributed about the outer periphery of the door and secondarily held by means of accordion rivets. Hinges are also provided at this outer periphery for insertion into a slide mount permanently affixed to the helicopter. A zipper is provided spaced from the outer periphery and in circumferential relation to a clear vinyl window provided on the door. In normal use, the zipper is actuated to open the door for ingress and egress. In emergency situations, quick removal of the door from the body of the vehicle may be effected by separation of the Velcro and accordion rivets which bind the door to the vehicle. In this manner, the entire door will pivot upon the hinge provided and an emergency exit will be available.

7 Claims, 11 Drawing Figures

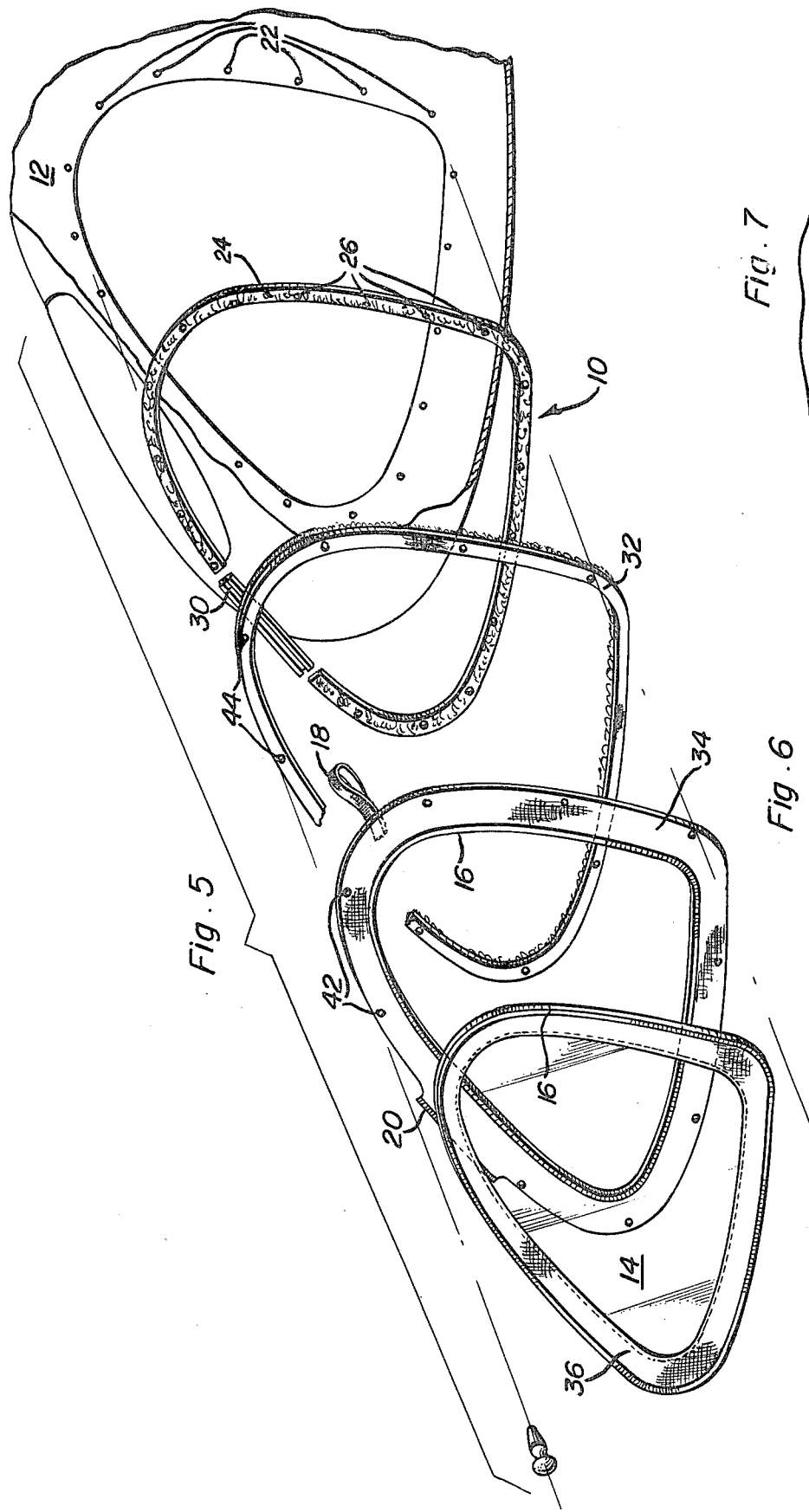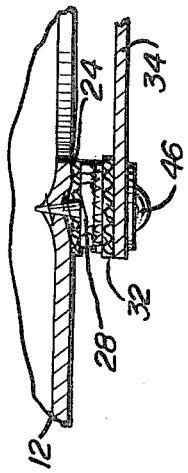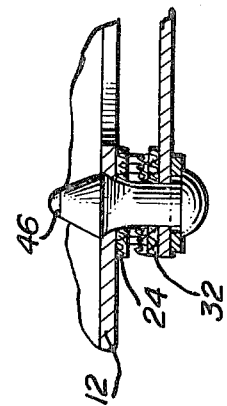

REMOVABLE SOFT DOOR FOR AIRCRAFT

BACKGROUND OF THE INVENTION

1. Field of the Invention

This invention relates to removable doors for aircraft and other vehicles wherein structure is provided to effect rapid release of the door from the vehicle in the event of an emergency.

2. Description of the Prior Art

Various doors and flexible partitions are known in the prior art for application to aircraft or other vehiclar transportion devices. For example, U.S. Pat. No. 4,073,452, issued Feb. 14, 1978 to Dieter Gosau, discloses a flexible door device having a defined air permeability for use in delaying the pressure drop due to explosive decomposition in a pressurized aircraft cabin structure. U.S. Pat. No. 3,423,121, issued Jan. 28, 1969 to Martin Lipkin, discloses a flexible protective partition for use as a barrier to be placed forward of passengers in a rapidly moving vehicle to protect the passenger from rapid deceleration of the vehicle by offering a soft barrier against which the passenger may be thrown upon rapid deceleration of the vehicle. U.S. Pat. No. 3,348,877, issued Oct. 24, 1967 to George Caramanna, shows a removable closure for vehicle bodies wherein a removable top section is provided in order to allow communication between the interior and exterior of a motor vehicle through the top thereof. U.S. Pat. No. 2,754,904, issued July 17, 1956 to Gaetano Provenzauo, contemplates a safety door for airplanes wherein a relatively fixed frame surrounds a swingable door having a frame cooperating with the fixed frame and including metal strips and two metal mesh screens. U.S. Pat. No. 2,257,103, issued Sept. 30, 1941, teaches the use of a flexible device to serve as a partition between the cockpit and the cabin of an airplane and as a seat for the pilot. U.S. Pat. No. 2,002,944, issued May 28, 1935, discloses an access opening for use in aircraft wherein a fabric covering has a slide fastening device for closing and opening the fabric covering and flexible webs securing the fastening device to opposite edtes of the covering and a rigid metal frame secured to the fabric to prevent the occurrence of streses due to skrinkage of the fabric.

SUMMARY OF THE INVENTION

The present invention contemplates a flexible vehicle door which provides the occupant of the vehicle with both a standard opening for ingress and egress in and emergency outlet from the vehicle. A semi-permanent attachment of the device to the vehicle is provided by the use of Velcro in combination with snap fasteners in a flexible hinged portion together with a handle such that the entire door device may be yanked open in an emergency. A zipper opening is also provided for standard operation of the door.

An object of the invention is to provide a flexible door for a vehicle wherein the door may be easily removed and folded for convenient storage thereof.

A further object of the present invention is to provide a flexible door for a vehicle which has a flexible vinyl window portion to provide visual communication through the door.

A still further object of the present invention is to provide an inexpensive, flexible door for a vehicle which provides a secure closure for the vehicle.

Yet a still further object of the present invention is to provide a flexible door which has a flexible hinge as a part thereof wherein the door may be removed in its entirety and rolled into a cylindrical shape and disposed alongside the hinge in order that the door opening may be free of obstructions but at the same time the door may be available to close the opening when desired.

Another object of the present invention is to provide attaching devices for securing the soft door to the aircraft which allow the operator the option of removing the soft door and replacing the original hard surfaced doorway for longer flights or when the flexible soft door is not to be used. The attachment devices are positioned on the periphery of the door opening in such a way as to not interfere with the re-installation of the original door.

A still further object of the present invention is to provide a door closure which is light in weight and provides a design which is amenable to use on a variety of door openings.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is an exploded perspective view of the door closure device of the present invention.

FIG. 6 is an enlarged view of the securing arrangement of the present invention using accordion rivets.

FIG. 7 is an enlarged view of the securing arrangement of the present invention using sheet metal screws.

DESCRIPTION OF THE PREFERRED EMBODIMENT

Figure 1:
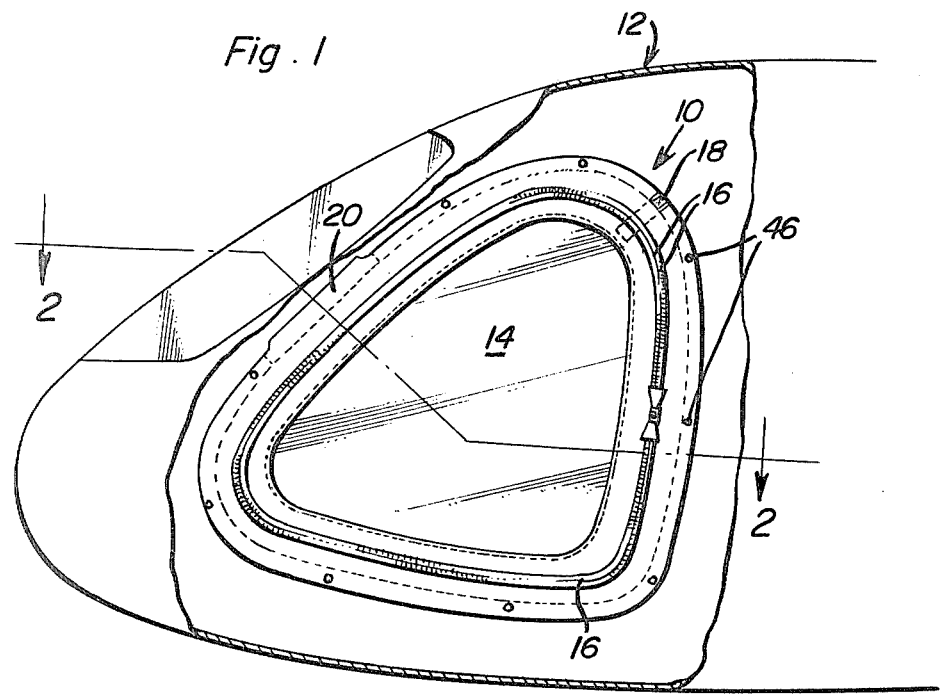
FIG. 1 is an elevational view of the door closure of the present invention as attached to the inside door opening of a helicopter.

Now with reference to the Figures, the door closure device of the present invention is generally referred to by the numeral 10. FIG. 1 shows the door closure device as arranged on the entry opening of a helicopter 12. The door closure device includes a clear vinyl center portion 14 which provides visual communication between the interior and the exterior of the helicopter. A main entry and exit door is defined by slide fastening devices or zippers 16 which are located about the periphery of the clear vinyl window 14. A pull strap 18 preferably colored with a bright red or orange pigment is located on one portion of the periphery of the device spaced from hinge 20 for removal of the entire device from the surface of the aircraft body, as will be explained hereinafter.

With reference to FIG. 5, the construction of the device will be clearly set forth. Aircraft body 12 has the main hard door, which was provided with it, removed. Velcro strip 24 or any other suitable hook and pile material is fastened to the periphery of the door opening by means of glue or any other suitable fastening means.

Figure 3:
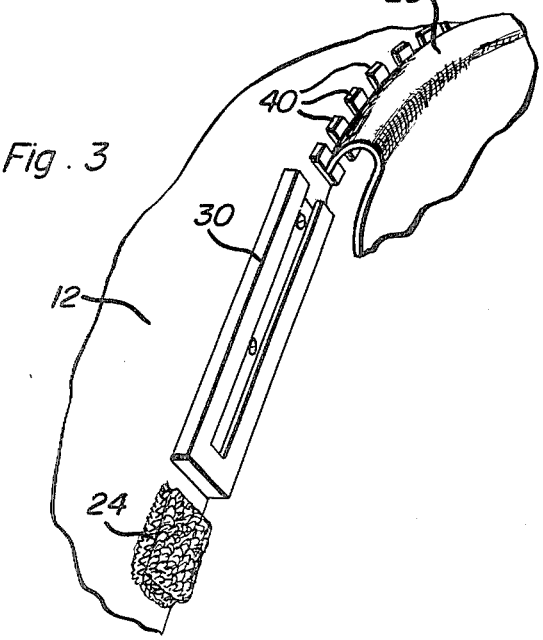
FIG. 3 is an enlarged view of the hinge of the present invention.
Figure 4:
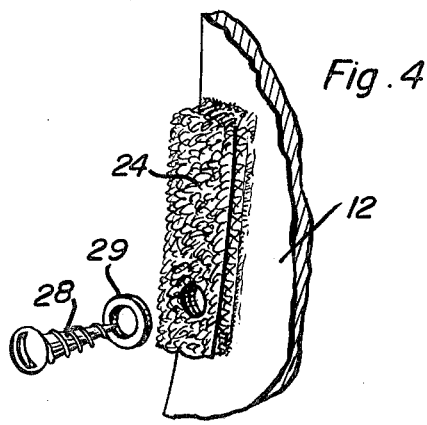
FIG. 4 is an enlarged fragmental perspective view of the Velcro and anchoring screw therefor.

After the glue has set, holes 26 and 22 are drilled respectively in the Velcro and the aircraft in alignment with each other. Screw type engagement means 28 which may be, for example, sheet metal screws, are attached to the aircraft body through alternate holes 26 to form an auxiliary permanent securing arrangement for securing the Velcro to the aircraft body. This arrangement can be clearly seen with reference to FIG. 4 wherein the Velcro strip 24 is shown as being glued to the aircraft body and a sheet metal screw 28 is shown together with washer 29 for threadedly engaging the aircraft body in order to provide for permanent cooperation therewith for securing the Velcro strip thereto. In linear alignment with the forward edge of the Velcro strip, is channel channel bar 30 which has a T-shaped channel disposed therein as depicted in FIG. 3. This channel may be secured to the aircraft body by threaded securing means such as sheet metal screws or any other appropriate securing means. This channel forms a part of a hinge for the entire door device as will be explained hereinafter.

As seen in FIG. 5, the door itself consists of clear vinyl portion 14 which has a similar shape to the door opening with dimensions slightly less than those of the door opening. Clear vinyl portion 14 is sewn by means of, preferably, double stitching to a perimeter portion of vinyl 36 which provides an equal width of vinyl about the perimeter of the clear vinyl portion. Disposed about the periphery of vinyl material 36 is one-half of the zipper 16. The cooperating half of zipper 16 is disposed on vinyl material 34, which has a shape similar to that of the door opening of the aircraft with the outermost edge being larger than the door opening and the innermost edge, to which zipper 16 is attached, being of the same dimension as the outer edge of vinyl piece 36. In this manner, the two halves 16 of the zipper may properly engage one another by the use of conventional sliders forming part of conventional double faced zippers. Disposed on the forward edge of the material 34 is a hinge 20, produced as an extension of vinyl material 34 and having at the edge thereof small transverse elements 40, as shown in FIG. 3, for engagement with the T portion of channel bar 30. When in this engagement, the transverse portions 40 together with hinge material 20 form a hinge on which the entire door arrangement may be pivoted. Pull handle 18 is also attached by sewing or riveting it to the main body of the door. The pull handle is provided for emergency exit use of the door whereby the pull handle is used to quickly remove the entire door from the surface of the craft in order that the entire door opening of the aircraft is exposed. The second Velcro strip, 32, is provided for cooperation with the first Velcro strip 24 and is coextensive therewith. Velcro strip 32 is attached to the outer edge of vinyl material 34 by use of, preferably, double stitching to enhance the strength of the securing arrangement.

Holes 42 and 44 are provided in vinyl strip 34 and Velcro strip 32, respectively, for alignment with alternate holes 26 which are aligned with holes 22. In this manner, the auxiliary securing arrangement may be provided by the use of fasteners 46 which may be in the form of accordion rivets as disclosed in U.S. Pat. No. 3,181,411. In this manner, the door panel is secured to the surface of the aircraft first by the cooperating Velcro strips 32 and 24 and secondarily by the snap-type fasteners 46 which are disposed through holes 42 and 44 and provided in engagement with the aircraft body. As seen in FIG. 7 then, the entire securing arrangement consists of a Velcro strip 24 which is first glued to the aircraft body and then secured by the use of threaded engagement devices 28. Then, the second Velcro strip 32, being sewn to vinyl portion 34, is secured to the first Velcro strip and also secured to the aircraft body by fasteners 46 which pass through vinyl 34 and strip 36.

Figure 2:
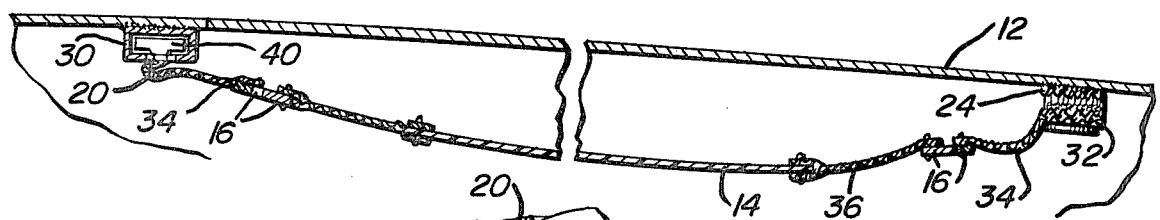
FIG. 2 is a sectional view of the door closure device as shown in FIG. 1 taken substantially along a plane passing through section lines 2—2.

With reference to FIGS. 1 and 2, it can clearly be seen that with the entire door arrangement secured to the body of the aircraft, entry and exit may be easily effected by actuation of zipper device 16 or, in an emergency, pull strap 18 may be employed to remove the entire door device from the surface of the aircraft by separation of Velcro strips 24 and 32 from each other and the removal of fasteners 46 from the body of the craft whereupon the door will swing open pivoting at hinge 20.

In this manner, an effective door device is provided which may be used to seal openings in automobiles, airplanes, helicopters and other forms of vehicular transportation. By the securing arrangement employed, a door is provided which provides the occupant of the vehicle with a high degree of security and at the same time is flexible whereby it may be quickly and easily removed in the event of an emergency or removed and conveniently stored in the event that the door opening is to be left uncluttered for the pursuit of such endeavors as photography, air ambulance work, sling work and the like. By use of Velcro strips, the door may be removed and secured at any point as desired or the door may be rolled up in contact with the hinge provided and secured thereat by the use of tie strings.

The primary use of the soft door is to give the operator a better view of the ground or allow him to put his head or arm outside the vehicle for photography or crane work. At other times, the soft door may be removed, leaving Velcro strip 24 and channel bar 30 attached to the aircraft body, and the original hard surface door may be reinstalled. The operation of the original door will not be hindered in any way by the remaining soft door attachment devices.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A vehicle door covering device for attachment to a primary opening in a vehicle, comprising:
   a primary covering means for removably enclosing said primary opening said primary covering means including a transparent window portion;
   a secondary covering means attached to said primary covering means by a slide fastener device disposed about the peripheral edge of said primary covering means; and
   attachment means for removably attaching said secondary covering means to a vehicle body for enabling removal of said secondary covering means and said primary covering means, said attachment means including a primary attachment means disposed in a continuous manner about the periphery of said secondary covering means and a secondary attachment means comprising snap fastener devices spaced about the periphery of said secondary covering means and in communication with said primary attachment means for providing a double attachment arrangement.

2. The device of claim 1 wherein said secondary covering means has a handle means attached thereto for providing a position for applying force to remove said secondary covering means from the vehicle body.

3. The device of claim 1 wherein said secondary covering means has attached thereto a hinge means for providing a hinged engagement with a vehicle body, said hinge means being disposed in substantial alignment with a portion of said attachment means.

4. The device of claim 1 wherein the door covering device is made of a non-rigid material.

5. In combination with a helicopter having a door opening disposed therein, a covering device for enclosing said opening, said covering device comprising a flexible panel sufficient in size to surround said door opening; an attachment means comprising a "Velcro" fastener disposed in a continuous manner about a portion of the periphery of said flexible panel; snap fastener devices spaced about the periphery of said panel and in communication with said "Velcro" fastener; a slide fastening device disposed on said flexible panel and spaced from the peripheral edge thereof for allowing removing of the center of said flexible panel; a transparent window disposed spaced inwardly from said slide fastening device; and hinge means disposed on the periphery of said flexible panel and in alignment with a portion of said "Velcro" fastener.

6. The invention as defined in claim 5 wherein said hinge means includes a channel-shaped member disposed on the periphery of said door opening and a slide means disposed on the periphery of said panel and adapted to slidably engage said channel section for removably holding said panel to said channel section.

7. The invention as defined in claim 6 and further wherein said hinge means is disposed on the forward portion of said door opening; and including securing straps disposed on said door opening for tying said panel in a rolled, compact configuration.

* * * * *